(12) United States Patent
Ichimaru

(10) Patent No.: US 10,822,033 B2
(45) Date of Patent: Nov. 3, 2020

(54) VEHICLE STRUCTURE

(71) Applicant: IIDA INDUSTRY CO., LTD., Inazawa-shi (JP)

(72) Inventor: Tetsuya Ichimaru, Kiyosu (JP)

(73) Assignee: IIDA INDUSTRY CO., LTD., Inazawa-Shi (JP)

( * ) Notice: Subject to any disclaimer, the term of this patent is extended or adjusted under 35 U.S.C. 154(b) by 19 days.

(21) Appl. No.: 16/248,368

(22) Filed: Jan. 15, 2019

(65) Prior Publication Data

US 2019/0233010 A1    Aug. 1, 2019

(30) Foreign Application Priority Data

Jan. 26, 2018    (JP) .................. 2018-011899

(51) Int. Cl.
| | |
|---|---|
| *B62D 21/00* | (2006.01) |
| *B62D 29/00* | (2006.01) |
| *B62D 27/02* | (2006.01) |
| *B62D 25/02* | (2006.01) |
| *B62D 25/04* | (2006.01) |
| *B62D 25/06* | (2006.01) |

(52) U.S. Cl.
CPC .......... *B62D 21/00* (2013.01); *B62D 27/023* (2013.01); *B62D 29/002* (2013.01); *B62D 25/02* (2013.01); *B62D 25/04* (2013.01); *B62D 25/06* (2013.01)

(58) Field of Classification Search
CPC .... B62D 29/002; B62D 25/04; B62D 29/001; B62D 29/005; B62D 25/00; B62D 29/00; B62D 25/025; B62D 21/15

USPC .... 296/187.02, 205, 193.06, 203.01, 901.01, 296/35.1, 29; 29/897.2, 428, 417, 526.01, 29/527.1
See application file for complete search history.

(56) References Cited

U.S. PATENT DOCUMENTS

| | | | |
|---|---|---|---|
| 7,004,536 B2 * | 2/2006 | Wieber ................. | B62D 25/06 296/146.6 |
| 8,926,005 B2 * | 1/2015 | Barz ..................... | B62D 25/04 296/193.06 |
| 2001/0020794 A1 * | 9/2001 | Ishikawa ............... | B62D 25/04 296/187.02 |

(Continued)

FOREIGN PATENT DOCUMENTS

| | | |
|---|---|---|
| JP | 2012228987 | * 11/2012 |
| WO | 2015/037444 A | 3/2015 |

*Primary Examiner* — D Glenn Dayoan
*Assistant Examiner* — Sunsurraye Westbrook
(74) *Attorney, Agent, or Firm* — Proskauer Rose LLP

(57) ABSTRACT

A vehicle structure provided with a hollow structural member includes one or more reinforcement members that are located in the hollow structural member and include a foaming member. The hollow structural member includes a first hollow structural portion that is configured by a first panel portion, a second hollow structural portion that is configured by a second panel portion, and a third hollow structural portion that is configured by a third panel portion and couples the first and second hollow structural portions to each other. The one or more reinforcement members include at least one of first and second reinforcement members. The first reinforcement member includes a first foaming member connected to the first and third panel portions. The second reinforcement member includes a second foaming member connected to the second and third panel portions.

10 Claims, 2 Drawing Sheets

(56) References Cited

U.S. PATENT DOCUMENTS

| | | | |
|---|---|---|---|
| 2004/0221953 A1* | 11/2004 | Czaplicki | B62D 29/002 156/293 |
| 2006/0021697 A1* | 2/2006 | Riley | B62D 29/002 156/295 |
| 2006/0135635 A1* | 6/2006 | deVry | C08J 9/06 521/142 |
| 2008/0296164 A1* | 12/2008 | Dajek | B62D 29/002 205/80 |

* cited by examiner

VEHICLE STRUCTURE

CROSS REFERENCE TO RELATED APPLICATION

This application claims priority under 35 U.S.C. § 119 to Japanese Patent Application No. 2018-011899, filed Jan. 26, 2018, the contents of which are incorporated by reference herein in their entirety.

BACKGROUND

The present invention relates to a vehicle structure.

International Publication No. 2015/037444 discloses a vehicle structure provided with a hollow structural member that shapes the framework of a vehicle.

The vehicle structure provided with the hollow structural member disclosed in the above-described document is advantageous in terms of weight reduction of the vehicle. Nowadays, there is a wide variety of vehicle structures. For example, a vehicle structure includes two hollow structural portions, namely, a first hollow structural portion and a second hollow structural portion that extend in different directions such as the width direction and the vertical direction of a vehicle and are coupled to each other by an additional hollow structural portion, namely, a third hollow structural portion. In such a vehicle structure, the strength and rigidity of the hollow structural member may be insufficient.

SUMMARY

It is an object of the present invention to provide a vehicle structure that can be reinforced in a preferred manner.

A vehicle structure that solves the above-described problem is provided with a hollow structural member that shapes a framework of a vehicle. The vehicle structure includes one or more reinforcement members that are located in the hollow structural member and include a foaming member. The hollow structural member includes a first hollow structural portion that is configured by a first panel portion and extends in a first direction that is one of a width direction and a front-to-rear direction of the vehicle, a second hollow structural portion that is configured by a second panel portion and extends in a second direction that is a vertical direction of the vehicle, and a third hollow structural portion that is configured by a third panel portion and couples the first hollow structural portion and the second hollow structural portion to each other. The one or more reinforcement members include at least one of a first reinforcement member and a second reinforcement member. The first reinforcement member includes a first foaming member connected to the first panel portion and the third panel portion. The second reinforcement member includes a second foaming member connected to the second panel portion and the third panel portion.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION

First Embodiment

A vehicle structure according to a first embodiment will now be described with reference to FIG. 1.

Figure 1:
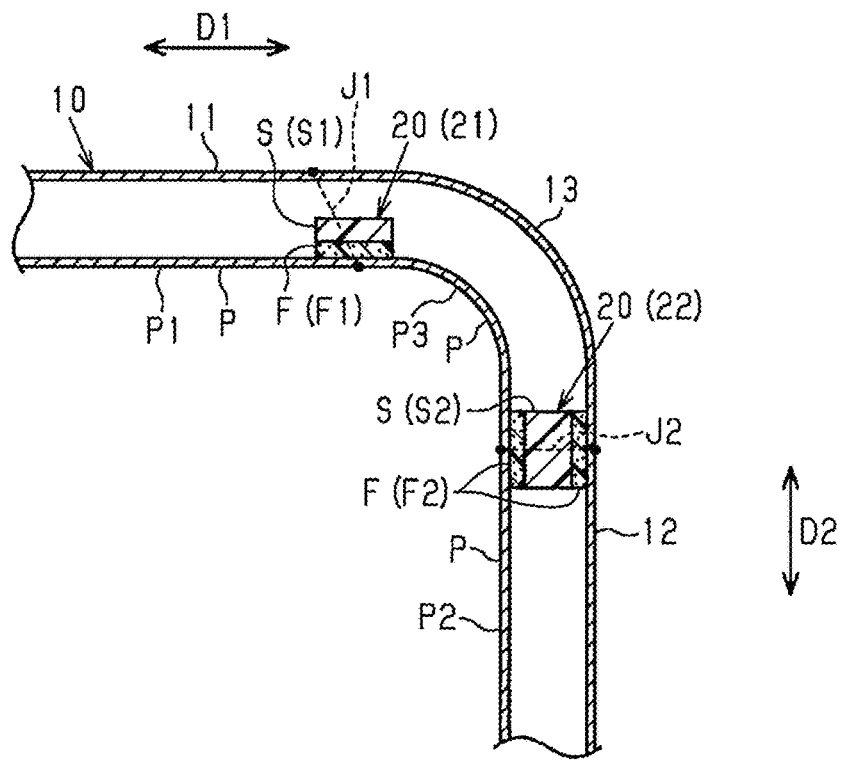
FIG. 1 is a cross-sectional view showing a vehicle structure according to a first embodiment.

As shown in FIG. 1, the vehicle structure is provided with a hollow structural member 10 that shapes the framework of a vehicle.

The hollow structural member 10 includes a first hollow structural portion 11 extending in a first direction D1, a second hollow structural portion 12 extending in a second direction D2, and a third hollow structural portion 13 that couples the first hollow structural portion 11 and the second hollow structural portion 12 to each other. The first direction D1 is a width direction (vehicle width direction) or a front-to-rear direction of the vehicle. The second direction D2 is a vertical direction of the vehicle.

The first hollow structural portion 11 in which the first direction D1 is the width direction of the vehicle includes, for example, a cross member or a rear header. The first hollow structural portion 11 in which the first direction D1 is the front-to-rear direction of the vehicle includes, for example, a roof rail or a rocker. The second hollow structural portion 12 includes, for example, various types of pillars. In the hollow structural member 10, for example, the first hollow structural portion 11 is a rear header, and the second hollow structural portion 12 is a pillar (for example, rear pillar).

The first hollow structural portion 11 is configured by a first panel portion P1. The first hollow structural portion 11 has a tubular shape due to the first panel portion P1 and includes a hollow part surrounded by the first panel portion P1. The second hollow structural portion 12 is configured by a second panel portion P2. The second hollow structural portion 12 has a tubular shape due to the second panel portion P2 and includes a hollow part surrounded by the second panel portion P2. The third hollow structural portion 13 is configured by a third panel portion P3. The third hollow structural portion 13 has a tubular shape due to the third panel portion P3 and includes a hollow part surrounded by the third panel portion P3. The first hollow structural portion 11 and the second hollow structural portion 12 extend straight. The third hollow structural portion 13 has a curved shape.

The first panel portion P1, the second panel portion P2, and the third panel portion P3 may be configured by a single panel or may be configured by coupling panels to one another. The hollow structural member 10 (each panel portion, namely, first panel portion P1, second panel portion P2, and third panel portion P3) according to the first embodiment includes a panel P located inside the vehicle and a panel P located outside the vehicle. FIG. 1 schematically shows part of the panel P located inside the vehicle. Each panel P may be made of a metal sheet such as a steel sheet or aluminum alloy sheet.

The first hollow structural portion 11 and the third hollow structural portion 13 are joined to each other by a first joining portion J1. The second hollow structural portion 12 and the third hollow structural portion 13 are joined to each other by a second joining portion J2. The first joining portion J1 is formed by performing spot welding, i.e., welding an end of the first panel portion P1 of the first hollow structural portion 11 to an end of the third panel portion P3 of the third hollow structural portion 13 in a state in which the ends are overlapped with each other. The second joining portion J2 is formed by performing spot welding, i.e., welding an end of the second panel portion P2 of the second hollow structural portion 12 to an end of the third panel portion P3 of the third hollow structural portion 13 in a state in which the ends are overlapped with each other. The first joining portion J1 includes an overlapped part in which the end of the first panel portion P1 is overlapped with the end of the third panel portion P3. In the same manner, the second joining portion J2 includes an overlapped part in which the end of the second panel portion P2 is overlapped with the end of the third panel portion P3. In FIG. 1, a part of an inner surface of the first joining portion J1 corresponding to the boundary between the first panel portion P1 and the third panel portion P3 and a part of an inner surface of the second joining portion J2 corresponding to the boundary between the second panel portion P2 and the third panel portion P3 are shown by broken lines.

The vehicle structure further includes a reinforcement member 20 located in the hollow structural member 10. The reinforcement member 20 according to the first embodiment includes a foaming member F and a supporting member S that supports the foaming member F. More specifically, the vehicle structure according to the first embodiment includes a first reinforcement member 21 and a second reinforcement member 22, each of which serves as the reinforcement member 20.

The first reinforcement member 21 includes a first foaming member F1 connected to the first panel portion P1 and the third panel portion P3 and a first supporting member S1 that supports the first foaming member F1. The second reinforcement member 22 includes second foaming members F2 connected to the second panel portion P2 and the third panel portion P3 and a second supporting member S2 that supports the second foaming members F2.

More specifically, the first reinforcement member 21 includes a single first foaming member F1 located on one surface of the first supporting member S1. The second reinforcement member 22 includes two second foaming members F2 arranged to hold the second supporting member S2 in between. In this manner, the number of foaming members F of a single reinforcement member 20 may be one or more.

The foaming member F may be fixed to the supporting member S by means of adhesion, pressure-sensitive adhesion, welding, or engagement.

The first reinforcement member 21 can be coupled to at least one of the first panel portion P1 and the third panel portion P3 by using part of the first supporting member S1 as a coupling part. The coupling part may be an adhesive layer or a pressure-sensitive adhesive layer. Preferably, a through-hole extends through at least one of the first panel portion P1 and the third panel portion P3, and the coupling part is provided by an engagement projection that engages with the through-hole. In the same manner, the second reinforcement member 22 can be coupled to at least one of the second panel portion P2 and the third panel portion P3 by the same coupling part as the first reinforcement member 21.

The foaming member F includes a foaming body. The foaming member F can be obtained from a foaming base material that is heated to form the foaming body. The foaming member F can be formed by arranging the reinforcement member 20, which includes the foaming base material, in the hollow structural member 10 (hollow portion) and then heating the reinforcement member 20 (foaming base material) from the outside. Heating from the outside includes heating in a process (drying process) for baking an electrophoretic coat applied to the hollow structural member 10. When heated, the foaming base material is foamed and hardened so that the foaming member F (foaming body) is obtained.

The foaming body can be made of a polymeric material. The foaming base material contains a base material, a blowing agent, and a cross-linking agent. The base material includes, for example, synthetic resin, elastomer, and rubber. The synthetic resin includes, for example, polyolefin, epoxy resin, phenolic resin, urethane resin, acrylic resin, styrene resin, and ethylene-vinyl acetate copolymer (EVA). The elastomer includes, for example, polybutadiene elastomer (RB), styrene-butadiene-styrene block copolymer (SBS), styrene-isoprene-styrene block copolymer (SIS), and styrene-ethylene-butylene styrene block copolymer (SEBS). The rubber includes, for example, natural rubber (NR), styrene-butadiene rubber (SBR), butadiene rubber (BR), nitrile rubber (NBR), chloroprene rubber (CR), isoprene rubber (IR), butyl rubber (IIR), ethylene-propylene-diene terpolymer (EPDM), urethane rubber (UR), epoxidized natural rubber (ENR), and ethylene-propylene rubber (EPM).

The blowing agent includes, for example, azodicarbonamide and dinitrosopentamethylenetetramine. The cross-linking agent includes, for example, dimethylurea and dicyandiamide.

The foaming base material may contain, if necessary, filler, plasticizer, and the like. The filler includes, for example, calcium carbonate, barium sulfate, ferrite, and silica.

The supporting member S may be made of a metal material or a plastic material. In terms of weight reduction, the supporting member S is preferably made of a plastic material (for example, polyamide).

The advantages of the first embodiment will now be described.

(1) The vehicle structure includes the reinforcement member 20 located in the hollow structural member 10. More specifically, the vehicle structure includes the first reinforcement member 21 and the second reinforcement member 22, each of which serves as the reinforcement member 20. The hollow structural member 10 includes the first hollow structural portion 11, the second hollow structural portion 12, and the third hollow structural portion 13. The first reinforcement member 21 includes the first foaming member F1, which is connected to the first panel portion P1 of the first hollow structural portion 11 and the third panel portion P3 of the third hollow structural portion 13. The second reinforcement member 22 includes the second foaming members F2, which are connected to the second panel portion P2 of the second hollow structural portion 12 and the third panel portion P3 of the third hollow structural portion 13.

With this structure, the first reinforcement member 21 increases the rigidity of a part where the first hollow structural portion 11 is adjacent to the third hollow structural portion 13. Further, the second reinforcement member 22 increases the rigidity of a part where the second hollow structural portion 12 is adjacent to the third hollow structural portion 13. This allows for preferred reinforcement of the vehicle structure. Thus, for example, deformation of the cross section of the hollow structural member 10 of the vehicle structure is limited.

(2) The first reinforcement member 21 includes the first supporting member S1. The second reinforcement member 22 includes the second supporting member S2. In this manner, the structure having the supporting member S that supports the foaming member F can be employed as the reinforcement member 20.

Second Embodiment

A vehicle structure according to the second embodiment will now be described with reference to FIG. 2. The description mainly focuses on the difference from the first embodiment. In the second embodiment, like or same reference numerals are given to those components that are the same as the corresponding components of the first embodiment. Such components will not be described in detail.

Figure 2:
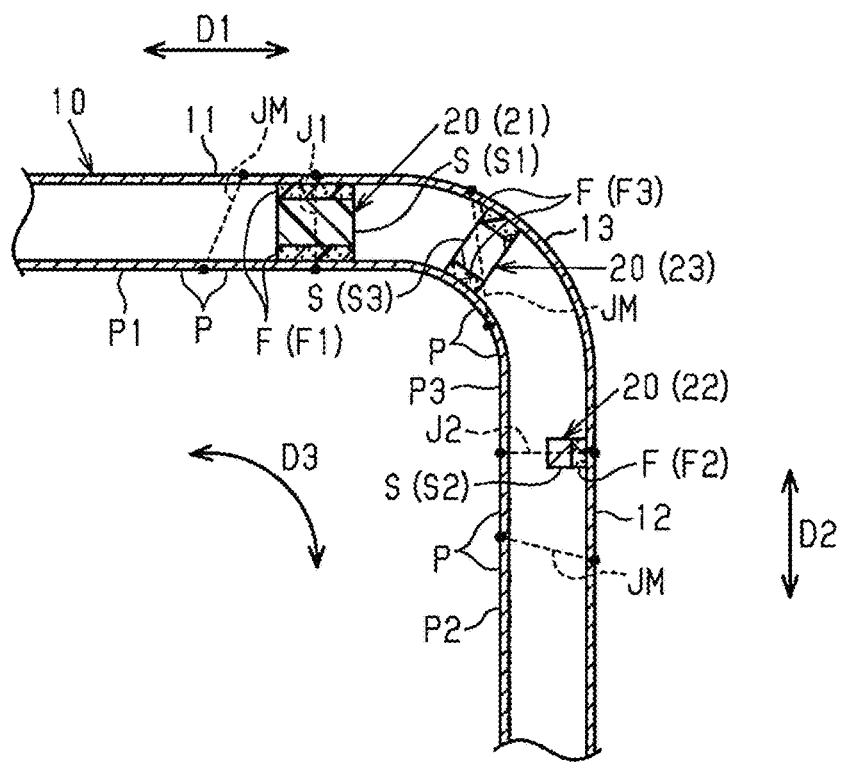
FIG. 2 is a cross-sectional view showing a vehicle structure according to a second embodiment.

As shown in FIG. 2, in a hollow structural member according to the second embodiment, the first panel portion P1, the second panel portion P2, and the third panel portion P3 are each configured by panels P. The first panel portion P1 includes a middle joining portion JM where two panels P adjacent to each other along the first direction D1 are joined to each other. The second panel portion P2 includes a middle joining portion JM where two panels P adjacent to each other along the second direction D2 are joined to each other. The third panel portion P3 includes a middle joining portion JM. In the middle joining portion JM, two panels P adjacent to each other along a third direction D3 in which the third hollow structural portion 13 extends are joined to each other.

The vehicle structure according to the second embodiment includes the first reinforcement member 21, the second reinforcement member 22, and a third reinforcement member 23, each of which serves as the reinforcement member 20.

The first reinforcement member 21 includes two first foaming members F1 arranged to hold the first supporting member S1 in between. The second reinforcement member 22 includes a single second foaming member F2 located on one surface of the second supporting member S2.

The third reinforcement member 23 is separate from the first reinforcement member 21 and the second reinforcement member 22. The third reinforcement member 23 includes third foaming members F3 connected to the third panel portion P3 and a third supporting member S3 that supports the third foaming members F3. Specifically, the third reinforcement member 23 includes two third foaming members F3 arranged to hold the third supporting member S3 in between. The two third foaming members F3 are connected to a curved surface curved along the third direction D3, in which the third hollow structural portion 13 extends.

The second embodiment has the following advantages in addition to advantages (1) and (2) of the first embodiment.

(3) The vehicle structure further includes the third reinforcement member 23, which is separate from the first reinforcement member 21 and the second reinforcement member 22. The third reinforcement member 23 includes the third foaming members F3, which are connected to the third panel portion P3. In this case, the rigidity of the third hollow structural portion 13 is increased by the third reinforcement member 23. This reinforces the vehicle structure in a more preferred manner.

(4) The inner surface of the third panel portion P3 of the third hollow structural portion 13 includes a curved surface curved along the third direction D3, in which the third hollow structural portion 13 extends. Connecting the third foaming members F3 to such a curved surface allows the third reinforcement member 23 to further increase the rigidity of the third hollow structural portion 13.

It should be apparent to those skilled in the art that the present invention may be embodied in many other specific forms without departing from the spirit or scope of the invention. Particularly, it should be understood that the present invention may be embodied in the following forms.

In the vehicle structure of the second embodiment shown in FIG. 2, one of the first reinforcement member 21 and the second reinforcement member 22 may be omitted.

Figure 3:
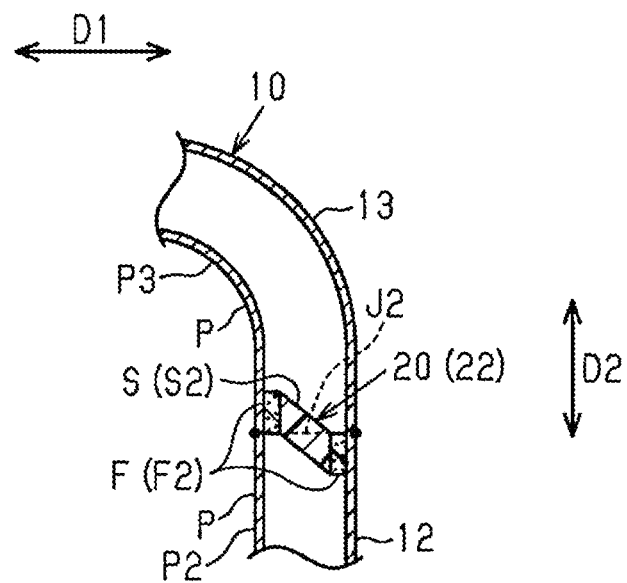
FIG. 3 is a cross-sectional view showing a vehicle structure according to a modification.

As shown in FIG. 3, the vehicle structure may only include, as the reinforcement member 20, the second reinforcement member 22. Alternatively, the vehicle structure may only include, as the reinforcement member 20, the first reinforcement member 21.

In the second reinforcement member 22 or the like according to the first embodiment, each of the two second foaming members F2 is connected to the second panel portion P2 and the third panel portion P3. The subject to which the two second foaming members F2 are connected may be changed as follows. For example, as shown in FIG. 3, one of the second foaming members F2 may be connected to the second panel portion P2, and the other one of the second foaming members F2 may be connected to the third panel portion P3. When the first reinforcement member 21 includes two first foaming members F1, one of the first foaming members F1 may be connected to the first panel portion P1, and the other one of the first foaming members F1 may be connected to the third panel portion P3. The first reinforcement member 21 may include three or more first foaming members F1 supported by the first supporting member S1. In the same manner, the second reinforcement member 22 may include three or more second foaming members F2 supported by the second supporting member S2.

The number of the first reinforcement members 21 may be one or more. The number of the second reinforcement members 22 may be one or more. The number of the third reinforcement members 23 may be one or more.

The vehicle structure may include a fourth reinforcement member in addition to the first, second, and third reinforcement members 21, 22, 23. The fourth reinforcement member includes, for example, a fourth foaming member connected only to the first panel portion P1 of the first hollow structural portion 11 or connected only to the second panel portion P2 of the second hollow structural portion 12.

Figure 4:
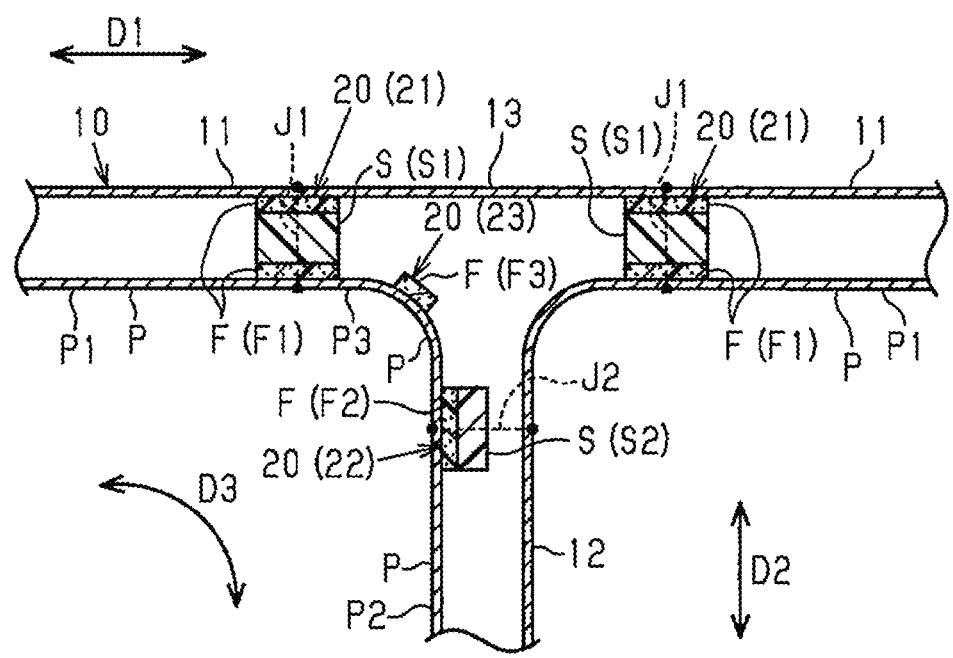
FIG. 4 is a cross-sectional view showing a vehicle structure according to another modification.

As shown in FIG. 4, the hollow structural member 10 may be modified to a hollow structural member 10 including two first hollow structural portions 11 arranged along the first direction D1. In the hollow structural member 10, the two first hollow structural portions 11 and a single second hollow structural portion 12 are coupled to each other by the third hollow structural portion 13. The vehicle structure includes a first reinforcement member 21 connected to the first panel portion P1 of one of the first hollow structural portions 11 and a first reinforcement member 21 connected to the first panel portion P1 of the other one of the first hollow structural portions 11. One of the first reinforcement members 21 may be omitted.

As shown in FIG. 4, the third reinforcement member 23 may only include the third foaming member F3. In the same manner, the first reinforcement member 21 and the second reinforcement member 22 may only include the first foaming member F1 and the second foaming member F2, respectively.

The third reinforcement member 23 according to the second embodiment may be connected to an inner surface other than the curved surface curved along the third direction D3, in which the third hollow structural portion 13 extends. That is, the third reinforcement member 23 may be connected to an inner surface extending along the first direction D1 or the second direction D2 in the vicinity of the end of the third hollow structural portion 13.

At least one of the first panel portion P1, the second panel portion P2, and the third panel portion P3 may be configured by panels P that are coupled in a radial direction. The entire third hollow structural portion 13 (third panel portion P3) simply needs to include an inner surface along the third direction D3, in which the third hollow structural portion 13 extends. That is, when the third panel portion P3 is configured by the panels P, which are coupled in the radial direction, a panel including a curved surface as an inner surface and a panel that does not include a curved surface as an inner surface may be combined with each other.

Therefore, the present examples and embodiments are to be considered as illustrative and not restrictive and the invention is not to be limited to the details given herein, but may be modified within the scope and equivalence of the appended claims.

What is claimed is:

1. A vehicle structure provided with a hollow structural member that shapes a framework of a vehicle, the vehicle structure comprising one or more reinforcement members that are located in the hollow structural member and include a foaming member, wherein
the hollow structural member includes
a first hollow structural portion configured by a first panel portion, wherein the first hollow structural portion extends in a first direction that is one of a width direction and a front-to-rear direction of the vehicle,
a second hollow structural portion configured by a second panel portion, wherein the second hollow structural portion extends in a second direction that is a vertical direction of the vehicle, and
a third hollow structural portion configured by a third panel portion, wherein the third hollow structural portion couples the first hollow structural portion and the second hollow structural portion to each other,
the first hollow structural portion and the third hollow structural portion are joined to each other by a first joining portion,
the second hollow structural portion and the third hollow structural portion are joined to each other by a second joining portion, and
the one or more reinforcement members include at least one of a first reinforcement member and a second reinforcement member, wherein
the first reinforcement member includes a first foaming member connected to both the first panel portion, which configures the first hollow structural portion, and the third panel portion, which configures the third hollow structural portion, and
the second reinforcement member includes a second foaming member connected to both the second panel portion, which configures the second hollow structural portion, and the third panel portion, which configures the third hollow structural portion.

2. The vehicle structure according to claim 1, wherein the one or more reinforcement members include the first reinforcement member and a third reinforcement member that is separate from the first reinforcement member, and
the third reinforcement member includes a third foaming member connected to the third panel portion.

3. The vehicle structure according to claim 1, wherein the one or more reinforcement members include the second reinforcement member and a third reinforcement member that is separate from the second reinforcement member, and
the third reinforcement member includes a third foaming member connected to the third panel portion.

4. The vehicle structure according to claim 1, wherein the one or more reinforcement members include both the first reinforcement member and the second reinforcement member.

5. The vehicle structure according to claim 4, wherein the one or more reinforcement members further include a third reinforcement member that is separate from the first reinforcement member and the second reinforcement member, and
the third reinforcement member includes a third foaming member connected to the third panel portion.

6. The vehicle structure according to claim 2, wherein the third hollow structural portion extends in a third direction and includes a curved surface curved along the third direction, and
the third foaming member is connected to the curved surface of the third hollow structural portion.

7. The vehicle structure according to claim 3, wherein the third hollow structural portion extends in a third direction and includes a curved surface curved along the third direction, and
the third foaming member is connected to the curved surface of the third hollow structural portion.

8. The vehicle structure according to claim 5, wherein the third hollow structural portion extends in a third direction and includes a curved surface curved along the third direction, and
the third foaming member is connected to the curved surface of the third hollow structural portion.

9. The vehicle structure according to claim 1, wherein at least one of the one or more reinforcement members includes a supporting member that supports the foaming member.

10. The vehicle structure according to claim 1, wherein the first direction is the width direction of the vehicle.

* * * * *